(12) United States Patent
Hager

(10) Patent No.: US 9,150,357 B2
(45) Date of Patent: Oct. 6, 2015

(54) ROLLER CONVEYOR WITH TORQUE SUPPORT

(71) Applicant: Interroll Holding AG, Sant'Antonino (CH)

(72) Inventor: Dietmar Hager, Wermelskirchen (DE)

(73) Assignee: Interroll Holding AG (CH)

( * ) Notice: Subject to any disclaimer, the term of this patent is extended or adjusted under 35 U.S.C. 154(b) by 134 days.

(21) Appl. No.: 13/994,471

(22) PCT Filed: Oct. 15, 2012

(86) PCT No.: PCT/EP2012/004305
§ 371 (c)(1),
(2) Date: Jun. 14, 2013

(87) PCT Pub. No.: WO2013/053499
PCT Pub. Date: Apr. 18, 2013

(65) Prior Publication Data
US 2014/0076685 A1      Mar. 20, 2014

(30) Foreign Application Priority Data
Oct. 13, 2011   (DE) .......................... 10 2011 115 865

(51) Int. Cl.
*B65G 13/11*    (2006.01)
*B65G 39/12*    (2006.01)

(52) U.S. Cl.
CPC ............... *B65G 13/11* (2013.01); *B65G 39/12* (2013.01)

(58) Field of Classification Search
CPC ......... B65G 39/12; B65G 13/11; B65G 39/10
USPC ........................................ 193/37, 35 C, 35 R
See application file for complete search history.

(56) References Cited

U.S. PATENT DOCUMENTS

| 3,721,326 A * | 3/1973 | Bussienne .................... 193/35 R |
| 5,056,651 A * | 10/1991 | Nagamatsu .................... 198/725 |

(Continued)

FOREIGN PATENT DOCUMENTS

| DE | 71 23 917   | 1/1973 |
| DE | 602 20 862  | 2/2008 |

(Continued)

OTHER PUBLICATIONS

German Office Action of May 30, 2012.

(Continued)

*Primary Examiner* — Gene Crawford
*Assistant Examiner* — Thomas Randazzo
(74) *Attorney, Agent, or Firm* — Gerald E. Hespos; Michael J. Porco; Matthew T. Hespos

(57) ABSTRACT

A roller conveyor (10) has a roller (20), a frame (30), and a torque support (40). The roller (20) has an axle (21) and a casing (23) rotatably supported around the axle (21). The frame (30) has a bearing (32) and a support recess (33). The torque support (40) has an axle recess (41) and a support projection (42). The axle (21) of the roller (20) is received in the axle recess (41) of the torque support (40), and is connected to the torque support (40) in a torsion-proof manner. The axle (21) is inserted in the bearing (32) of the frame (30). The support recess (33) of the frame (30) is arranged off-center with respect to the axis of rotation of the casing (23) of the roller (20). The support projection (42) of the torque support (40) engages the support recess (33) of the frame (30).

6 Claims, 5 Drawing Sheets

(56) References Cited

U.S. PATENT DOCUMENTS

| | | | |
|---|---|---|---|
| 6,302,255 B1* | 10/2001 | Hollander | 193/35 R |
| 6,692,000 B2* | 2/2004 | Borne et al. | 271/272 |
| 6,799,676 B1 | 10/2004 | Shipmon | |
| 7,588,135 B1* | 9/2009 | Chuang | 193/35 R |
| 7,661,884 B2 | 2/2010 | Jo | |
| 8,172,064 B2 | 5/2012 | Weichbrodt | |
| 8,307,976 B2 | 11/2012 | Kratz et al. | |
| 2002/0100662 A1* | 8/2002 | Kalm | 198/617 |
| 2003/0038014 A1* | 2/2003 | Itoh et al. | 193/37 |
| 2006/0032731 A1* | 2/2006 | Kanaris | 198/843 |
| 2006/0151301 A1* | 7/2006 | Landry | 198/813 |

FOREIGN PATENT DOCUMENTS

| | | |
|---|---|---|
| DE | 20 2008 009 212 | 11/2008 |
| EP | 1 285 869 | 2/2003 |
| JP | S61157811 | 7/1986 |
| WO | 2011/029119 | 3/2011 |

OTHER PUBLICATIONS

International Search Report of Jan. 24, 2013.
Japanese Office Action—Jun. 24, 2014.

* cited by examiner

ROLLER CONVEYOR WITH TORQUE SUPPORT

BACKGROUND

1. Field of the Invention

The invention relates to a roller conveyor with a torque support, and to a method for fixing a conveyor roller in a frame structure by means of a torque support.

2. Description of the Related Art

Roller conveyors with conveyor rollers serve to transport goods. In order to transport the goods on the roller conveyor, the goods have to be accelerated or decelerated in part. To this end, driven or braked rollers exist, in which a torque for positive or negative acceleration of the rotating speed of the roller casing is generated in the interior of the roller. This torque has to be transmitted to the frame in which the conveyor rollers are mounted. Here, the torque is usually transmitted to the frame via the axle of the conveyor roller.

To this end, various methods are used. Partly, the axles of the conveyor rollers are screwed to or clamped in the frame, or are fixed to the frame with more or less complicated mechanisms.

The known mechanisms are complex and expensive to produce and mount and/or involve the risk of steps during fixation, such as the tightening of screws, being forgotten or incorrectly performed. Here, the conveyor roller, in the case of a driven motorized roller in particular the cable, can be damaged when the axle twists.

It is an object of the invention to provide a roller conveyor in which the conveyor rollers are easy to mount and in which a high reliability against failure and low maintenance are ensured. Moreover, a method for fixing the roller is to be provided, which pursues this objective.

SUMMARY OF THE INVENTION

A first independent aspect of solving the object relates to a roller conveyor comprising a conveyor roller, a frame structure, and a torque support, wherein the conveyor roller has at least one axle element and a roller casing rotatably supported around the axle element, wherein the frame structure has at least one axle bearing and at least one support recess, wherein the torque support has an axle recess and at least one support projection, wherein the axle element of the conveyor roller is received in the axle recess of the torque support, and the axle element of the conveyor roller and the torque support are connected to each other in a torsion-proof manner, wherein the at least one axle element is inserted into the axle bearing of the frame structure, and wherein the at least one support recess of the frame structure is arranged off-center with respect to the axis of rotation of the roller casing of the conveyor roller, and the at least one support projection of the torque support engages the at least one support recess of the frame structure.

The frame structure can have two frame profiles, for example, between which the conveyor roller is arranged. The torque support serves to support a torque applied at the axle element on the frame structure. Such torque to be supported can be generated by a brake in the interior of the roller. Alternatively, the conveyor roller can be a motorized roller, which is driven via an electric motor arranged inside the roller casing, so that in this case the torque to be supported is a drive torque. Here, an electric cable serving to supply current to the electric motor can be led outward by the at least one axle element. Alternatively, the electric cable can be led by a second axle element arranged opposite to the at least one axle element. In these configurations, the torque support can prevent a rotation of the axle element with respect to the frame structure and thus damage of the cable in a simple manner. A plurality of conveyor rollers can be arranged in the frame structure. It is conceivable that one or more torque supports be provided for each conveyor roller. Since usually only some of the conveyor rollers are formed as braking rollers or as driven motorized rollers, only these braking or motorized rollers may be provided with torque supports. The torque support can be made of plastics or metal, in particular spring steel or stainless steel. The torque support can be formed as a bent sheet metal part, a bent wire part, an injection-molded part, or in any other way. A bent wire part can be bent from a piece of metal wire. The metal wire can have an arbitrary, in particular round cross section. The wire diameter can be approximately 3 mm. Torsion-proof means that torque of 5 Nm or 10 Nm, in specific embodiments 15 Nm or more, can be transmitted to the frame structure by the axle element via the torque support and be supported there, without plastic deformation occurring. This applies also to the embodiment in which the torque support is formed as a bent sheet metal part. The axle element of the conveyor roller can be put through an axle recess of the torque support to mount the torque support on the axle element. The torque support can be mounted to the finished conveyor roller. Here, the torque support can simply be pushed onto the axle element. The support projection can have a bent portion. This bent portion can be compressed elastically upon insertion into the support recess and springs back at the end of the insertion process. The bent portion can be dimensioned such that two opposite regions of the bent portion, in a state of being inserted in the support recess, bear against opposite edge regions of the support recess in an elastically biased manner. In this way, a fit with no play of the support projection in the support recess can be ensured.

One embodiment relates to the above-described roller conveyor, wherein the axle element of the conveyor roller extends through the axle recess of the torque support and the torsion-proof connection between the axle element and the torque support is caused by positive locking between the axle element of the conveyor roller and the axle recess of the torque support in the circumferential direction around the axle element.

Here, the axle element of the conveyor roller can be put through the axle recess of the torque support to mount the torque support on the axle element. The torque support can be mounted on the finished conveyor roller. The torque support can simply be pushed onto the axle element. The positive locking can be obtained by an inner cross section of the torque support with a corresponding outer cross section of the axle element. The corresponding cross sections can be round and formed in a flattened way on one side. Other configurations may be oval, triangular, quadrangular, pentagonal, hexagonal, or spline shaft-shaped, or have forms other than the mere circular shape. The torque support can extend around annularly the axle region, wherein the ring can be closed or opened at one point. It is conceivable that an intermediate element be arranged on the axle element, which establishes the positive locking with the torque support via its outer cross section. Such an intermediate element can be a nut, for example, which is screwed onto the axle element and is fixed on the axle element via a screw locking. The hexagonal outer cross section of the nut can correspond to the inner cross section of the torque support.

The conveyor roller with a thus preassembled torque support can be inserted into the frame structure. Here, the torque support can latch in the frame structure via a latching device. In this way, it can be ensured that when the conveyor roller is inserted, the axle element can be connected to the frame structure in a torsion-proof manner without requiring a further mounting step. Thus, it can be ensured that an assembled conveyor roller is always connected to the frame structure in a torsion-proof manner without requiring a separate mounting step, such as screwing the axle element to the frame structure.

A further embodiment relates to one of the above-described roller conveyors, wherein the axle element has a hexagonal cross-sectional area, and wherein the torque support is formed as a bent wire part, wherein the bent wire part has a positive locking region corresponding to the hexagonal cross section.

The hexagonal cross-sectional area of the axle element can be provided by a hexagon nut, which is screwed onto an external thread of the axle element and is connected to the axle element in a torsion-proof manner. Alternatively, an integral axle element can have a hexagonal cross-sectional area itself.

A further embodiment relates to one of the above-described roller conveyors, wherein the bent wire part has three straight portions at an angle of 60° with respect to each other, which in the mounted state bear against a side surface of the hexagonal cross-sectional area.

In this case, the hexagonal cross-sectional area of the axle element can have six side surfaces at an angle of 240° with respect to each other on the radially outer side, just like with a hexagonal nut.

A second independent aspect for solving the object relates to a conveyor roller, wherein the three straight portions are bent from a single piece of wire, wherein the middle straight portion, which along the course of the piece of wire is located between the two other lateral straight portions, is connected to the two other lateral straight portions via a circular segment-shaped arc of the piece of wire.

An embodiment relates to the above-described conveyor roller, wherein on the side of the respective lateral straight portion opposite to the middle straight portion, a support portion follows each of the lateral straight portions.

Each of the support portions can comprise a support projection. The support portions can each have a straight leg portion, wherein the straight leg portions extend opposite to each other. The support projections can be provides at the end of the leg portions. The three straight portions, the two support portions, and the support projections can be formed integrally from a bent wire portion.

Each of the support portions can be bent toward the frame structure in the axial direction of the axle element at its end following the straight leg. In other words, each of the support portions can be bent at its end out of a plane that is spanned by the three straight legs.

A further embodiment relates to one of the above-described roller conveyors, wherein the frame structure comprises a frame profile, and wherein the support recesses are formed by two recesses in the frame profile.

The frame profile can be formed as a casting profile, a continuous casting profile, or as a sheet metal profile. The support recesses can be formed by two elongated holes per torque support, for example. Thus, the support portions can engage the support recesses in the frame profile so that torque applied to the axle element can be introduced into the frame via the torque support and be supported there. In this way, the position of the conveyor roller transverse to the axial direction of the axle element can be ensured at the same time, which can be advantageous in the case of bearing sites open at the top, for example.

A further embodiment relates to one of the above-described roller conveyors, wherein the axle element of the conveyor roller extends through the axle recess of the torque support and the torsion-proof connection between the axle element and the torque support is ensured by force closure, or non-positive locking.

Such force closure can be established by screwing the torque support onto the axle element, for example. For such a threaded connection, the axle element can have an external thread onto which two nuts, between which the torque support is clamped, can be screwed. To this end, the torque support itself does not need to have internal threads. Alternatively, the torque support can be clamped between a shoulder on the axle element and a nut, or in another way, e.g. with snap rings, or circlips. Other constructions are also conceivable. In this embodiment as well, the axle element of the conveyor roller can be put through the axle recess of the torque support in order to be mounted. In addition to the threaded connection, positive locking can be provided between the axle element of the conveyor roller and the axle recess, which complements the force closure of the threaded connection. In this respect, the above explanations with regard to the positive locking and the configuration of the force closure apply accordingly.

A further embodiment relates to one of the above-described roller conveyors, wherein the torque support is formed as a bent sheet metal part.

Such a bent sheet metal part can be clamped between two nuts, between a shoulder on the axle element and a nut. Alternatively, the bent sheet metal part can be fixed on the axle element with one or more snap rings, or circlips, for example. Additionally or alternatively, a torque support formed as a bent sheet metal part can be connected to the axle element in a torsion-proof manner by means of positive locking. The above explanations on positive lockings and force closure apply accordingly.

A further embodiment relates to one of the above-described roller conveyors, wherein the support projections are held in the support recesses by means of elastic latching connections.

The support projections can be formed in an elastically resilient manner. To this end, in the case of a bent wire part, each support projection can be formed of a bent wire portion, which at its thickest point is slightly wider than the corresponding clearance width, or clear span, of the support recess. Correspondingly, in the case of a bent sheet metal part, each support projection can be formed of a bent sheet metal portion, which at its thickest portion is slightly wider than the corresponding clearance width, or clear span, of the support recess. In both cases, the support projection can be compressed at the widest point upon insertion into the support recess and spring back elastically at the end of the insertion process, so that the support projection is held in the support recess. The latching connection can have a latching device at the support projection. The latching device can be formed as a bent portion at the support projection. This bent portion can be compressed elastically upon insertion into the support recess and springs back at the end of the insertion process, and engage the support recess behind. Here, the bent portion can be dimensioned such that two opposite regions of the bent portion, in a state of being inserted in the support recess, bear against opposite edge regions of the support recess in an elastically biased manner. In this way, a fit with no play of the support projection in the support recess can be ensured.

A further embodiment relates to one of the above-described roller conveyors, wherein the torque support is arranged on the inner side of the frame structure facing toward the conveyor roller.

This configuration facilitates the insertion of the conveyor roller with the torque support. In particular, the conveyor roller can be preassembled with the torque support in this way. Upon insertion of the conveyor roller into the frame structure, the axle element can be inserted into the axle bearing of the frame structure, wherein the support projection(s) of the torque support can engage with the corresponding support recess(es) and latch in there.

A further embodiment relates to one of the above-described roller conveyors, wherein the torque support, the axle element, and the frame structure cooperate such that the axle element of the conveyor roller is fixed by the torque support relative to the frame structure in the radial and/or axial direction(s).

The specification in the radial direction refers to the axle element and the axis of rotation of the conveyor roller. For example, an axle element can be fixed in the axle bearing even if the circumference of the axle element is not surrounded free of play in all directions by the axle bearing. Thus, it is also possible to realize an embodiment in which the axle bearing is wider than the axle element in the lateral direction and/or an embodiment in which the axle bearing is open at the top. In such embodiments, the axle element can be easily laid or swiveled into the axle bearing. In this case, by means of the torque support, the axle element cannot only be prevented from torsion, but in addition also be fixed in the axle bearing so as to not slip out in the radial direction, in particular in the lateral direction or to the top.

The specification in the axial direction refers to the axle element and the axis of rotation of the conveyor roller. In this embodiment, the axle cannot only be prevented from torsion by the torque support, but can be fixed in the axle bearing in addition, so that the conveyor roller is prevented from slipping off to the side. Here, the torque support can be configured such that slippage in one direction or in both directions is prevented. Such axial fixation can be achieved by latching the torque support on the frame structure, e.g. by means of a latching device, which can be formed as a latching nose on the support projection of the torque support. Such a latching nose can latch in the support recess of the frame structure and thereby prevent the axle element from slipping out of the axle bearing in the axial direction.

An embodiment in which axial and radial fixations are achieved is conceivable. Also, in another embodiment, only a fixation in the radial direction can be provided, or in yet another embodiment, only a fixation in the axial direction can be provided.

A fixation of the axle element in the axle bearing by the torque support can be accomplished free of play in the radial and/or axial direction(s). A fixation of the axle element in the axle bearing by the torque support can be performed such that the position of the axle element in the axle bearing in the axial direction and particularly in the radial direction does not change even when torque is applied. To this end, the material and the dimensions of the torque support with respect to the maximum torque to be generated by the conveyor roller can be such that a fixation of the axle element in the axle bearing with no play is ensured throughout the entire torque range.

A further embodiment of one of the above-described conveyor rollers relates to a conveyor roller, wherein the axle element is connected to the frame structure via the torque support such that the axle element bears against the axle bearing in an elastically biased manner in the direction of gravity.

By this configuration, the noise level during operation of the roller conveyor can be reduced, since due to the elastic bias the axle elements are pressed into the axle bearings and thus a relative movement of the axle elements in the axle bearings is reduced or prevented. By this configuration, the axle element can be held in the axle bearing with no play.

A second independent aspect for solving the object relates to a method for fixing a conveyor roller in a frame structure of a roller conveyor, comprising the followings steps:

providing a conveyor roller with at least one axle element and a roller casing rotatably supported around the axle element, providing a frame structure with at least one axle bearing and with at least one support recess, providing a torque support, which is formed separately from the conveyor roller and the frame structure, with at least one support projection, fixing the torque support on the axle element of the conveyor roller in a torsion-proof manner, inserting the axle element of the conveyor roller into the axle bearing of the frame structure, and engaging the support projection of the torque support with the support recess of the frame structure.

A further embodiment of the method relates to a method wherein the torsion-proof fixation of the torque support is performed before the insertion of the axle element of the conveyor roller into the axle bearing of the frame structure, and wherein engaging the support projection of the torque support with the support recess of the frame structure is performed at the same time as the insertion of the axle element of the conveyor roller into the axle bearing of the frame structure.

Further steps and orders of steps of the above-mentioned methods result from the above explanations concerning the first aspect and the following description of the figures.

In the following, individual embodiments for solving the object will be described by way of example with reference to the figures. The individual, described embodiments partly include features that are not absolutely necessary for realizing the claimed subject matter, but which provide characteristics desired for specific applications. Thus, embodiments not including all features of the embodiments described below are also considered to be disclosed by the described technical teaching. In order to avoid unnecessary repetitions, specific features will only be mentioned with respect to individual embodiments described in the following. It is pointed out that the individual embodiments are not to be contemplated only individually, but also in combination. From this combination, the skilled person will see that individual embodiments can be modified by incorporating one or more features of other embodiments. It is pointed out that a systematic combination of individual embodiments with one or more features described with respect to other embodiments can be desirable and expedient, and therefore is to be taken into consideration and be considered to be comprised by the description.

BRIEF DESCRIPTION OF THE DRAWINGS

FIG. 2 shows a partial sectional view of the roller conveyor of FIG. 1a.

DETAILED DESCRIPTION OF THE PREFERRED EMBODIMENTS

Figure 1A:
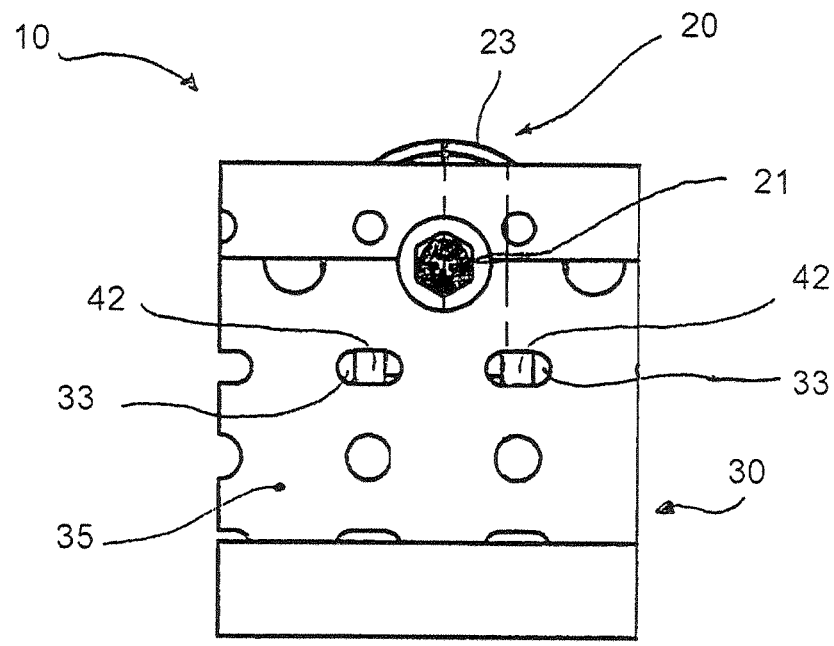
FIG. 1a shows a first embodiment of a roller conveyor in side view.
Figure 1B:
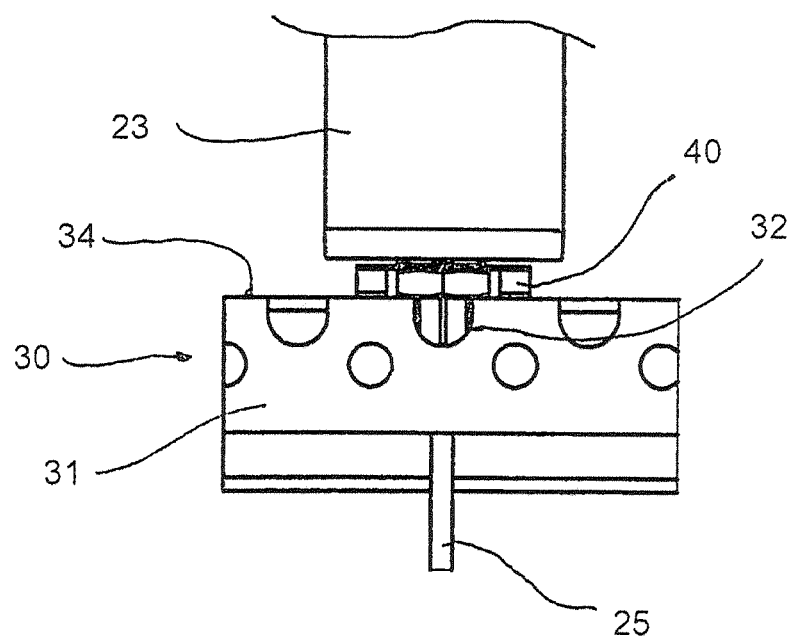
FIG. 1b shows the embodiment of the roller conveyor of FIG. 1a from the top.

FIGS. 1a and 1b show a first embodiment of a roller conveyor 10 in a side view and in a top view, respectively.

The roller conveyor 10 has a frame structure 30, a conveyor roller 20, and a torque support 40. The conveyor roller 20 comprises an axle element 21 around which a roller casing 23 is rotatably supported. The axle element 21 is received in an axle bearing 32 of the frame profile 31. Here, the axle bearing 32 is formed as an elongated recess in the frame profile 31, which is open at the top, so that the axle element can be placed into the axle bearing from above.

In the illustrated embodiment, the axle element 21 is formed hollow on the inside, so that space is provided for an electric cable 25 in the axial direction, which can be seen in FIG. 1 b and which extends into the interior of the conveyor roller 20 through the axle element 21.

In this embodiment, the torque support 40 is provided between the conveyor roller 20 and the frame profile 31. The torque support 40 is connected to the axle element 21 in a torsion-proof manner, as will be explained in detail below with respect to the following figures. In order for torque to be supported on the frame structure 30, the torque support 40 has two support projections 42, which engage corresponding support recesses 33 in the frame profile 31.

FIG. 1a shows a side view in which the direction of sight is toward an outer side 35 of the frame structure and in which the support recesses 33 can be seen, which the support projections 42 engage. As illustrated, the support recesses 33 are formed as elongated holes, which are arranged off-center in relation to the conveyor roller 20 and the axle element 21 thereof. The form of the support recesses is illustrated by way of example only. Other forms are conceivable as well.

By arranging the torque support 40 on the inner side 34 of the frame structure, the illustrated conveyor roller 20 can be mounted easily by inserting the axle element 21 into the axle bearing 32 and, at the same time, by the support projections 42 engaging the support recesses 33 and latching there.

Figure 2:
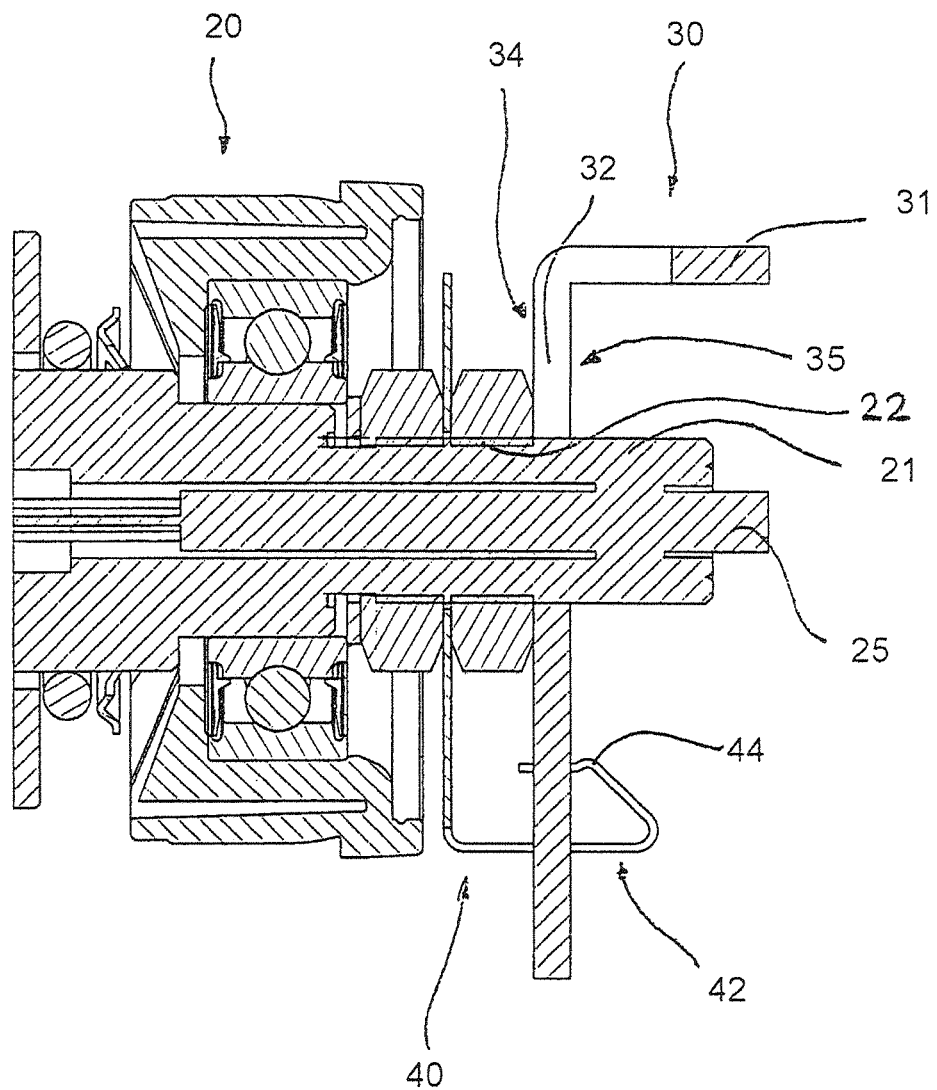
Figure 3:
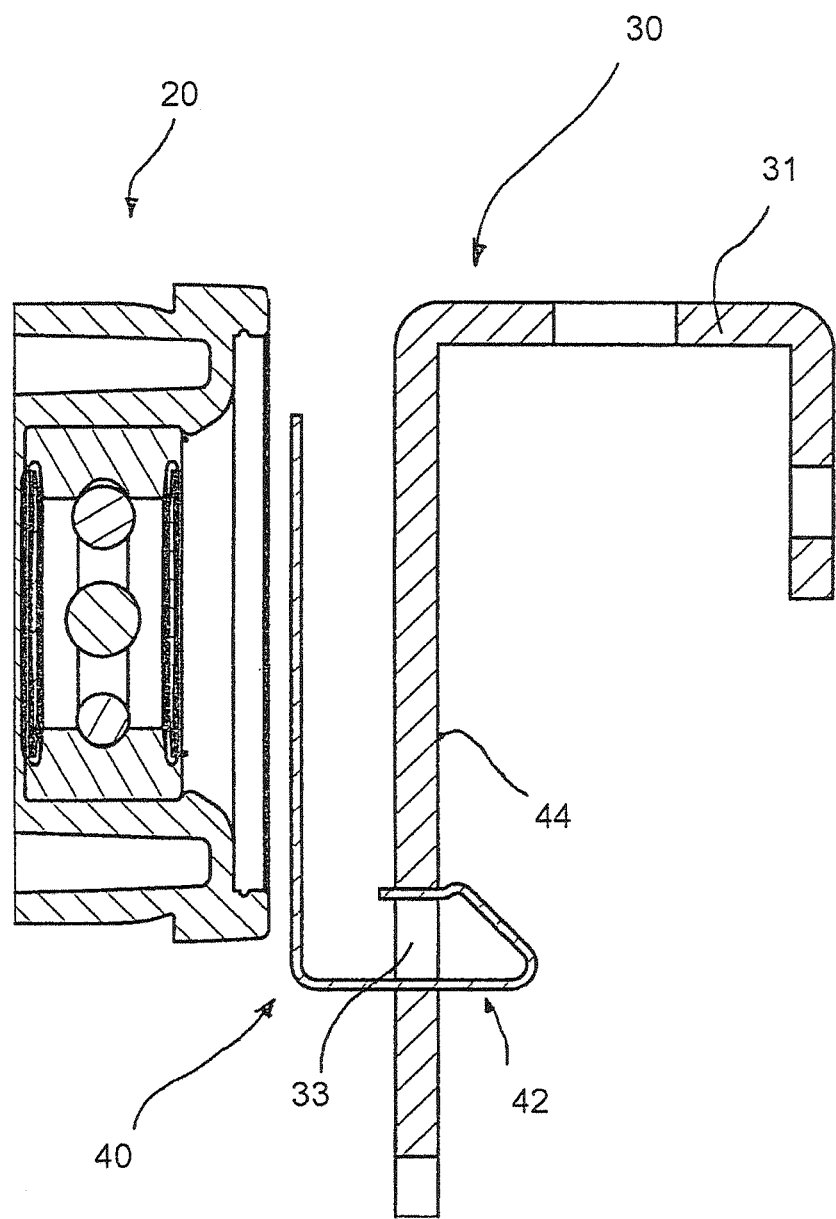
FIG. 3 shows a further partial sectional view of the roller conveyor in a different sectional plane.

FIG. 2 shows a partial sectional view of the roller conveyor 10 of FIG. 1a, and FIG. 3 shows a further partial sectional view of the same roller conveyor 10 from the same direction in a different sectional plane, which in the direction of sight is located in front of the sectional plane illustrated in FIG. 2. Some components illustrated in FIG. 2 are not shown in FIG. 3 in order to better see the torque support 40.

Figure 5A:
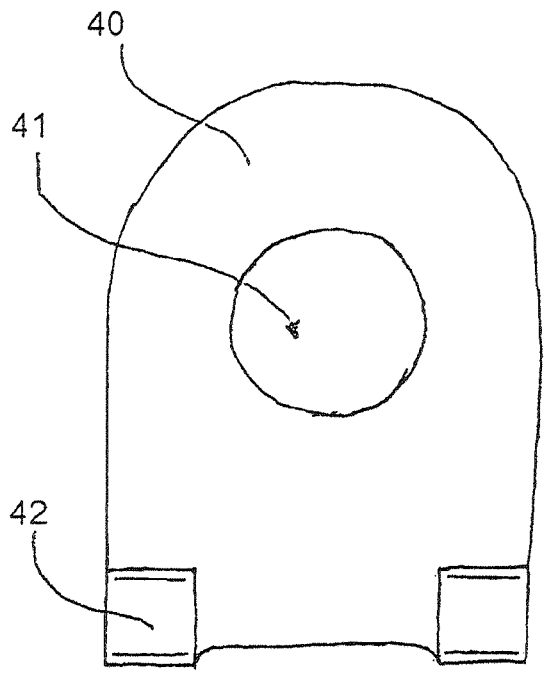
FIGS. 5a-5c show different views of a torque support, which is part of the embodiment shown in FIGS. 1 to 3.
Figure 5B:
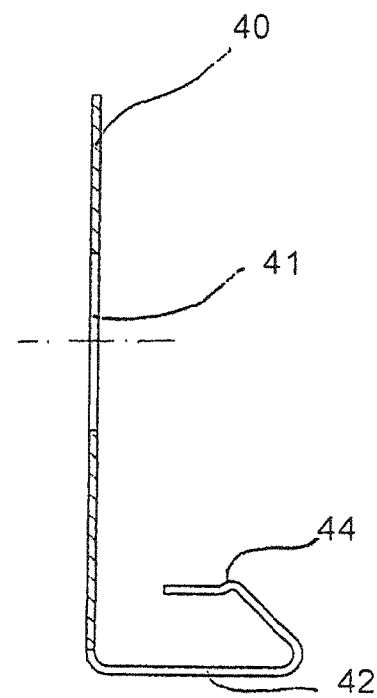
Figure 5C:
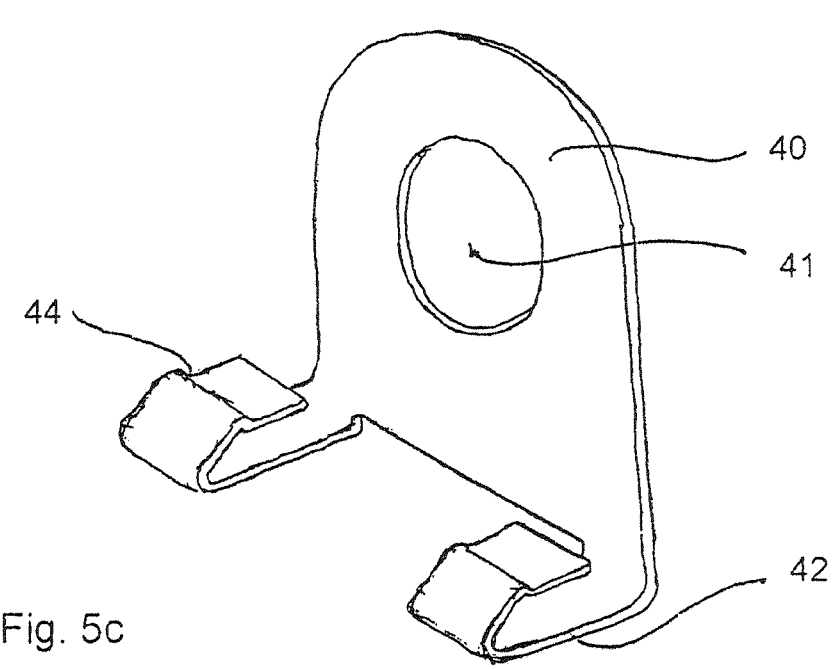

Different views of the torque support 40 used in this embodiment are illustrated in FIGS. 5a to 5c.

As illustrated in the mentioned figures, the torque support 40 is formed as a bent sheet metal part in this embodiment. The torque support 40 has an axle recess 41, which in the illustrated embodiment has a circular design and through which the axle element 21 of the conveyor roller can be put. Alternatively, the axle recess 41 could be flattened at a side of the circular edge, and the axle element 21 could be flattened in a corresponding region of the surface, so that a positive locking between the axle element 21 and the torque support 40 is provided. Other forms of establishing a positive locking are conceivable as well.

The axle element 21 has an external thread 22 onto which two nuts are screwed. The torque support is clamped between the two nuts. By tightening the two nuts with respect to each other, the torque support 40 is fixed on the axle element 21 in a torsion-proof manner. Here, the position of the torque support in the axial direction can be adjusted by positioning the two nuts before they are tightened. In the above-mentioned case as well, in which a positive locking is provided between the axle element 21 and the torque support 40, the torque support 40 can be fixed or tightly clamped in the axial direction by means of one or two screws. Alternatively, in this case, the torque support 40 can be secured in the axial direction in another way, e.g. by snap rings, or circlips.

In the illustrated embodiment, the nut located on the outside with respect to the conveyor roller 20 contacts the inner side 34 of the frame structure when the conveyor roller 20 is inserted in the frame structure. In this state, the support projections 42 engage the support recesses 33 of the frame profile 31 and fix the conveyor roller 20 in the axial direction, so that the conveyor roller 20 is fixed in a defined position in the axial direction without requiring further mounting steps.

In this embodiment, the torque support is made integrally of spring sheet metal. Alternatively, a stainless steel or any other material can be used.

The torque support 40 has a flat region in which axle recesses 41 are provided. The support projections 42 extend substantially perpendicularly to this region in a direction parallel to the axle element or parallel to the axis of rotation of the conveyor roller. A bent region is formed at the end of the support projections 42, which first has a slope that facilitates insertion into the support recess. This bent portion can slightly be compressed elastically upon insertion into the support recess and springs back toward its original non-deformed position at the end of the insertion path. The two opposite legs of the bent portion bear against corresponding opposite edge regions of the support recess 33, so that the support projections 42 are received in the support recesses in a biased manner and with no play.

The latching devices 44 provided on the support projections 42 are configured such that they can be detached without tools. In other embodiments, latching can be performed such that the latching device 44 engages the frame profile 31 behind in a hook-like manner, so that slippage of the conveyor roller 20 in the axial direction is not possible and optionally a tool is required for loosening the connection.

Figure 4A:
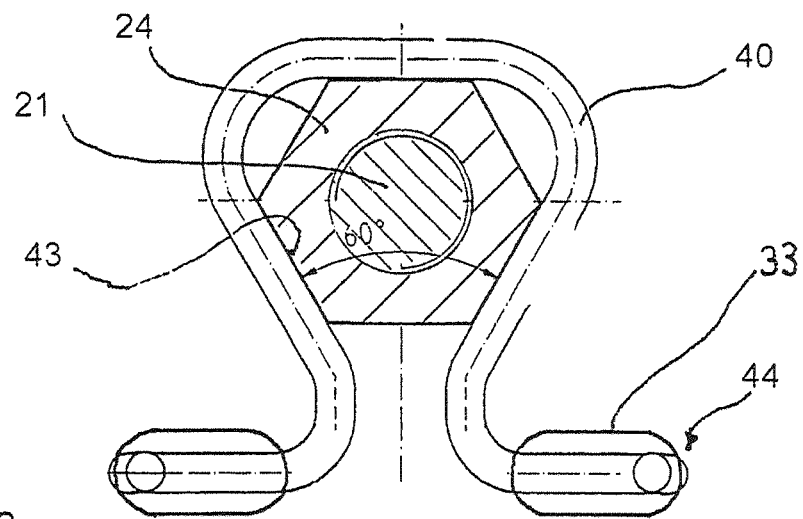
FIGS. 4a to 4c show different views of a torque support.
Figure 4B:
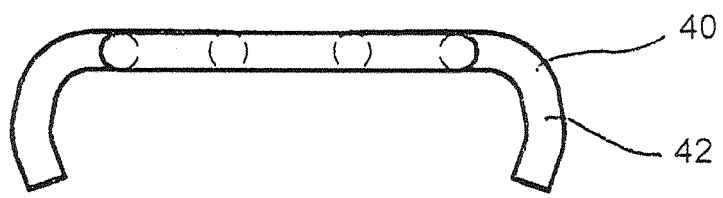
Figure 4C:
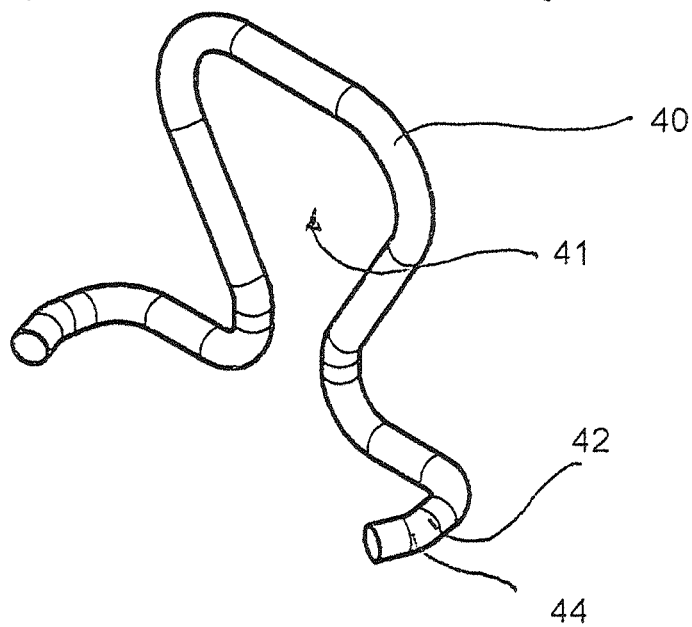

FIGS. 4a-4c show different views of a further embodiment of a torque support 40. In this embodiment, the torque support 40 is formed as a bent wire part of spring wire. The torque support 40 is fixed against rotation on an intermediate element 24 in the circumferential direction by positive locking. To this end, the intermediate element 24 is formed as a hexagonal nut.

The intermediate element 24 can be connected to the axle element 21 via a screw locking not illustrated in the figures. A screw locking can be provided by a chemical or mechanical screw locking, in particular a positive screw locking or non-positive, or force closure, screw locking.

Alternatively, the axle element 21 itself can have a corresponding hexagonal cross section in a region along its longitudinal extension, so that no intermediate element 24 would be required.

In the illustrated embodiment, the axle element 21 is shown without a through hole for an electric cable. In this embodiment, the conveyor roller 20 can be a braked conveyor roller 20, in which a brake is arranged inside the roller casing 23. A brake, such as a centrifugal brake, does not require electricity, so that no electric cable has to be provided here. Alternatively, in a driven conveyor roller, the electric cable can also be provided on the roller side opposite to the illustrated axle element 21 with torque support 40.

The torque support 40 formed as a bent wire part has three straight portions at an angle of 60° with respect to each other. Further lateral straight portions extend from both sides of a middle straight portion, one from each side. The lateral straight portions are each followed by support portions in the lateral direction. Each support portion is provided with one support projection 42. In the illustrated embodiment, the entire bent wire part is bent from a continuous piece of wire. The three straight portions surround the intermediate element 24 in the form of a ring open on one side. The three straight portions bear against one side of the hexagonal nut each, so that the torque support 40 is fixed on the axle element 21 via a positive locking in the circumferential direction.

As illustrated in FIG. 4a, the support projections 42 are each provided with a latching device 44. The support projections can be compressed elastically. In the compressed state, the latching devices 44 have a smaller distance than the clearance width, or clear span, of the corresponding support recesses 33. In this embodiment as well, the conveyor roller 20 can be inserted into the frame profile 31 along with the torque support 40 arranged on the axle element 21 without tools. The support projections 42 with the latching devices 44 arranged thereon are slightly compressed upon insertion, enter into the corresponding support recesses 33, and expand again on the outer side 35 of the frame structure, so that the torque support 40 latches in the frame structure 30 with no play.

The invention claimed is:

1. A roller conveyor (10), comprising:
   a frame structure (30) having at least one axle bearing (32) and at least one support recess (33);
   a torque support (40) having an axle recess (41) and at least one support projection (42);
   a conveyor roller (20) having at least one axle element (21) and a roller casing (23) rotatably supported around the axle element (21), the axle element (21) of the conveyor roller (20) extending through the axle recess (41) of the torque support (40) and being positively locked to the axle recess (41) of the torque support (40) in a circumferential direction around the axle element (21) so that the conveyor roller (20) and the torque support (40) are connected to each other in a torsion-proof manner, the at least one axle element (21) further being inserted in the axle bearing (32) of the frame structure (30), wherein
   the at least one support recess (33) of the frame structure (30) is arranged off-center with respect to the axis of rotation of the roller casing (23) of the conveyor roller (20),
   the at least one support projection (42) of the torque support (40) engages the at least one support recess (33) of the frame structure (30),
   the axle element (21) has a polygonal cross-sectional area, and
   the torque support (40) is formed as a bent wire part that has a positive locking region (43) corresponding to the polygonal cross section.

2. The roller conveyor (10) according to claim 1, wherein the polygonal cross section is hexagonal and wherein the bent wire part has three straight portions at an angle of 60° with respect to each other, which in the mounted state bear against a side surface of the hexagonal cross-sectional area.

3. The roller conveyor (10) according to claim 2, wherein the three straight portions are bent from a single piece of wire, wherein the middle straight portion, which along the course of the piece of wire is located between the two other lateral straight portions, is connected to the two other lateral straight portions via a circular segment-shaped arc of the piece of wire.

4. The roller conveyor (10) according to claim 3, wherein on the side of the respective lateral straight portion opposite to the middle straight portion, a support portion follows each of the lateral straight portions.

5. A method for fixing a conveyor roller in a frame structure of a roller conveyor, comprising the followings steps:
   providing a conveyor roller (20) with at least one axle element (21) and a roller casing (23) rotatably supported around the axle element (21),
   providing a frame structure (30) with at least one axle bearing (32) and with at least one support recess (33),
   providing a torque support (40), which is formed separately from the conveyor roller (20) and the frame structure (30), with at least one support projection (42),
   fixing the torque support (40) on the axle element (21) of the conveyor roller (20) in a torsion-proof manner so that the axle element (21) cannot rotate relative to the torque support (40),
   inserting the axle element (21) of the conveyor roller (20) into the axle bearing (32) of the frame structure (30), and
   engaging the support projection (42) of the torque support (40) with the support recess (33) of the frame structure (30).

6. The method for fixing a conveyor roller (20) according to claim 5, wherein the torsion-proof fixation of the torque support (40) is performed before the insertion of the axle element (21) of the conveyor roller (20) into the axle bearing (32) of the frame structure (30), and wherein engaging the support projection (42) of the torque support (40) with the support recess (33) of the frame structure (30) is performed at the same time as the insertion of the axle element (21) of the conveyor roller (20) into the axle bearing (32) of the frame structure (30).

* * * * *